(12) United States Patent
Kim et al.

(10) Patent No.: US 8,224,244 B2
(45) Date of Patent: Jul. 17, 2012

(54) COMMUNICATION APPARATUS

(75) Inventors: Jin-Kyung Kim, Daejeon (KR);
Sung-Weon Kang, Daejeon (KR);
Chang-Hee Hyoung, Daejeon (KR);
Jin-Bong Sung, Daejeon (KR);
Jung-Hwan Hwang, Daejeon (KR);
Duck-Gun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1060 days.

(21) Appl. No.: 12/107,024

(22) Filed: Apr. 21, 2008

(65) Prior Publication Data
US 2008/0287061 A1 Nov. 20, 2008

(30) Foreign Application Priority Data

Oct. 25, 2005 (KR) .................. 10-2005-0100621

(51) Int. Cl.
*H04B 5/00* (2006.01)
(52) U.S. Cl. ...... 455/41.1; 455/127.1; 455/80; 455/100; 340/825.72; 340/333; 607/32; 607/60; 375/219; 375/295
(58) Field of Classification Search .................. 455/41.1, 455/127.1, 80, 100, 106, 41.2; 370/498; 375/219, 295, 146; 607/32; 340/333, 825.72, 340/384.1, 5.64
See application file for complete search history.

(56) References Cited

U.S. PATENT DOCUMENTS

| | | | | |
|---|---|---|---|---|
| 4,591,854 A | * | 5/1986 | Robinson | 340/5.65 |
| 4,918,737 A | * | 4/1990 | Luethi | 381/315 |
| 4,930,011 A | * | 5/1990 | Kiewit | 725/10 |
| 5,303,306 A | * | 4/1994 | Brillhart et al. | 381/315 |
| 5,796,827 A | * | 8/1998 | Coppersmith et al. | 713/182 |
| 6,115,636 A | * | 9/2000 | Ryan | 607/60 |
| 6,151,521 A | * | 11/2000 | Guo et al. | 600/407 |
| 6,218,958 B1 | * | 4/2001 | Eichstaedt et al. | 340/7.6 |
| 6,223,018 B1 | * | 4/2001 | Fukumoto et al. | 455/41.1 |
| 6,336,031 B1 | | 1/2002 | Schyndel | |
| 6,354,299 B1 | * | 3/2002 | Fischell et al. | 128/899 |
| 6,542,717 B1 | * | 4/2003 | Zimmerman et al. | 455/41.1 |
| 6,754,472 B1 | * | 6/2004 | Williams et al. | 455/100 |
| 6,861,944 B1 | * | 3/2005 | Hoepelman | 340/5.1 |
| 6,864,780 B2 | * | 3/2005 | Doi et al. | 340/5.64 |
| 6,898,299 B1 | * | 5/2005 | Brooks | 382/115 |

(Continued)

FOREIGN PATENT DOCUMENTS
EP 1107489 A2 6/2001
(Continued)

OTHER PUBLICATIONS

International Search Report for related International Application No. PCT/KR2006/001437, dated Dec. 18, 2007 (2 pages.)

(Continued)

*Primary Examiner* — Marceau Milord (57) ABSTRACT

The present invention provides a communication apparatus being in directly contact with a human body and using the human body as a transmission channel for data communication. The communication apparatus attached to the human body transmits a signal in the form of a current, receives a signal transmitted from another communication apparatus attached to the human body therethrough, and eliminates noise included in the received signal. In addition, the communication apparatus compares the noise-eliminated signal and a reference signal and recovers an original signal. Further, the communication apparatus generates a base-band signal and transmits the same through the human body.

9 Claims, 12 Drawing Sheets

U.S. PATENT DOCUMENTS

| | | | |
|---|---|---|---|
| 6,978,164 B2 * | 12/2005 | Vicendese | 455/575.6 |
| 7,076,206 B2 * | 7/2006 | Elferich et al. | 455/41.1 |
| 7,082,316 B2 * | 7/2006 | Eiden et al. | 455/519 |
| 7,177,703 B2 * | 2/2007 | Boveja et al. | 607/118 |
| 7,191,012 B2 * | 3/2007 | Boveja et al. | 607/60 |
| 7,263,405 B2 * | 8/2007 | Boveja et al. | 607/60 |
| 7,285,090 B2 * | 10/2007 | Stivoric et al. | 600/300 |
| 7,323,992 B2 * | 1/2008 | Doan et al. | 340/572.4 |
| 7,400,257 B2 * | 7/2008 | Rivas | 340/573.1 |
| 7,668,122 B2 * | 2/2010 | Sung et al. | 370/280 |
| 7,860,455 B2 * | 12/2010 | Fukumoto et al. | 455/41.1 |
| 7,933,554 B2 * | 4/2011 | Hoyt et al. | 455/41.2 |
| 2003/0092973 A1 | 5/2003 | Kim et al. | |
| 2005/0079871 A1 * | 4/2005 | Kirk et al. | 455/446 |

FOREIGN PATENT DOCUMENTS

| | | |
|---|---|---|
| EP | 1298822 A2 | 4/2003 |
| JP | 2001-077735 | 3/2001 |
| KR | 1020030039759 A | 5/2003 |
| WO | WO 2004/066833 A1 | 8/2004 |

OTHER PUBLICATIONS

Sasaki, et al., "Sensitive and Stable Electro-Optic Sensor for Intrabody Communication", IEEE, vol. 1, Issue 7-11, Nov. 2004, pp. 122-123.

Matsushita et al., "Wearable Key: Device for Personalizing Nearby Environment", The Fourth International Symposium on Wearable Computers, 2000, pp. 119-126.

* cited by examiner

COMMUNICATION APPARATUS

TECHNICAL FIELD

The present invention relates to a communication apparatus using the human body as a propagation medium. More particularly, it relates to a communication apparatus for generating a base-band signal and transmitting the same by using the human body as a communication channel.

BACKGROUND ART

Human body communication is where a signal is transmitted by using a human body rather than by using a wire. In human body communication, the electrical signal is transmitted through the human body without using electric wires since the human body conducts electricity.

Recently, various information communication apparatuses such as a personal digital assistant (PDA), a portable personal computer, a digital camera, an MP3 player, and a cellular phone have been widely used. Users use information by transmitting/receiving e-mails and downloading data through these apparatuses. However, simple data transmitting/receiving cannot be achieved by using these apparatuses since they require a physical communication line (e.g., a cable), a predetermined adaptor, or a connector in order to transmit information stored in one communication device to another communication device.

Also, when apparatuses for checking health status, for example an electrocardiograph (ECG), a non-invasive blood pressure (NIBP) module, and a heart monitor transmit results to a computer or other communication apparatuses so that the results are used along with other information, a physical communication line should be used as the data are transmitted between the above-described communication apparatuses.

Particularly, when these apparatuses are connected by cables in the vicinity of the human body to perform the data communication, the cables apply a load on the human body and disturb mobility of the human.

The communication apparatuses and the apparatuses for checking health status have common functions, such as display, memory, and digital signal processing functions, as well as unique functions for converting digital information into a voice signal or communicating with the Internet or other users. Accordingly, when these functions are properly applied, they can efficiently use communication resources and perform simple and easy data communication. For this purpose, human body communication has been developed.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a communication apparatus having advantages of maintaining high speed communication performance while reducing power consumption, and using a human body as a communication channel.

Technical Solution

An exemplary human body communication apparatus using a human body as a data transmission channel is provided according to the present invention. The human body communication apparatus includes an electrode unit, a high pass filter, a comparator, and a controller. The electrode unit is placed in direct contact with the human body for transmitting a signal in a form of a current through the human body and receives the signal from the human body, and the high pass filter eliminates noise included in the signal received through the electrode unit. In addition, the comparator compares the signal transmitted through the high pass filter and a reference voltage and generates a signal waveform, and the controller recovers the signal transmitted through the comparator.

When the communication apparatus is used for transmitting data, the controller generates a base-band signal and transmits the same to the human body such that the human body is used as a transmission channel for data communication.

Advantageous Effects

According to the present invention, data can be easily communicated through a human body by using an inexpensive communication apparatus that consumes less power than when using an RF module and data leakage due to hacking can be prevented since a human body can be used as a data transmission channel.

In addition, data are transmitted using a base-band signal without using an RF module, thereby enhancing energy efficiency.

In addition, a plurality of electrodes are used such that efficient data communication can be achieved by controlling the number and size of the electrodes to be appropriate for the communication status through the human body.

BEST MODE

An exemplary embodiment of the present invention will hereinafter be described in detail with reference to the accompanying drawings.

In the following detailed description, only a preferred exemplary embodiment of the present invention has been shown and described, simply by way of illustration. As those skilled in the art would realize, the described embodiment may be modified in various different ways, all without departing from the spirit or scope of the present invention.

Accordingly, the drawings and description are to be regarded as illustrative in nature and not restrictive, and like reference numerals designate like elements throughout the specification. Throughout this specification and the claims which follow, unless explicitly described to the contrary, the word "comprise," and variations such as "comprises" or "comprising," should be understood to imply the inclusion of the stated elements but not the exclusion of any other elements.

The word "host" as used throughout the specification represents various information communication devices that are capable of transmitting data by accessing another communication apparatuses according to an exemplary embodiment of the present invention. Thus, various devices that have a self-operation function and data processing capability can be used as hosts.

Hereinafter, a communication apparatus and a method thereof according to an exemplary embodiment of the present invention will be described in detail with reference to the accompanying drawings.

Figure 1:
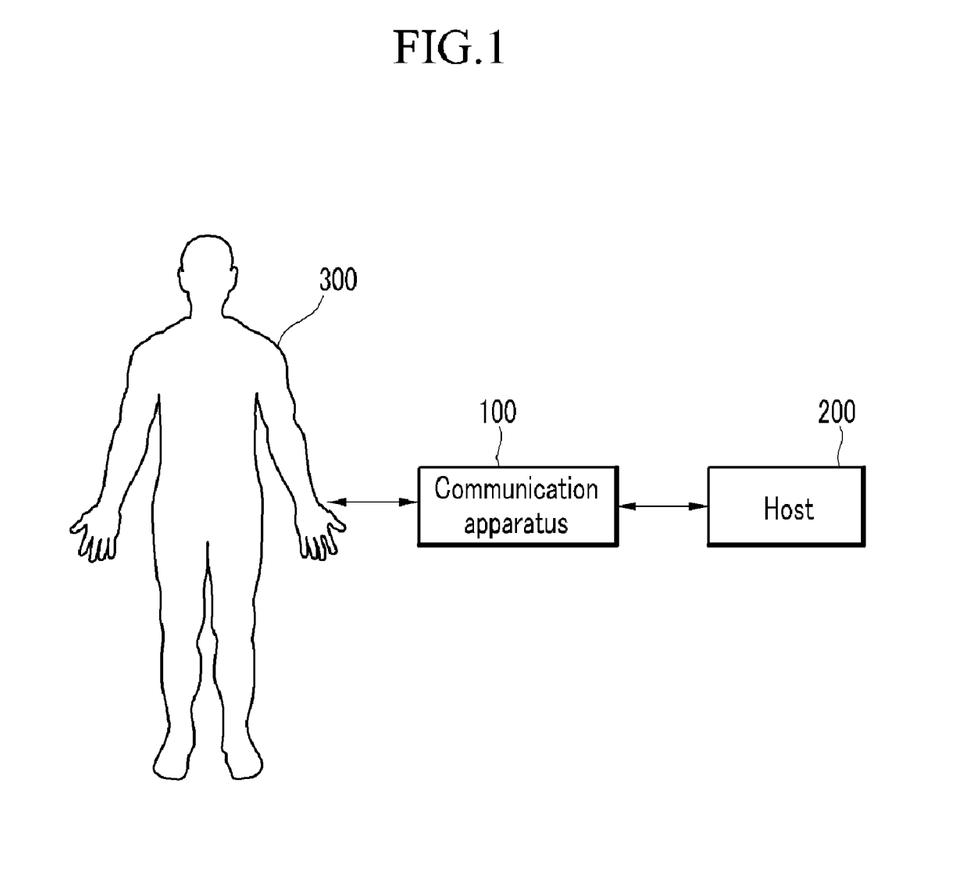
FIG. 1 shows a communication apparatus for accessing a human body and a host according to an exemplary embodiment of the present invention.
Figure 2:
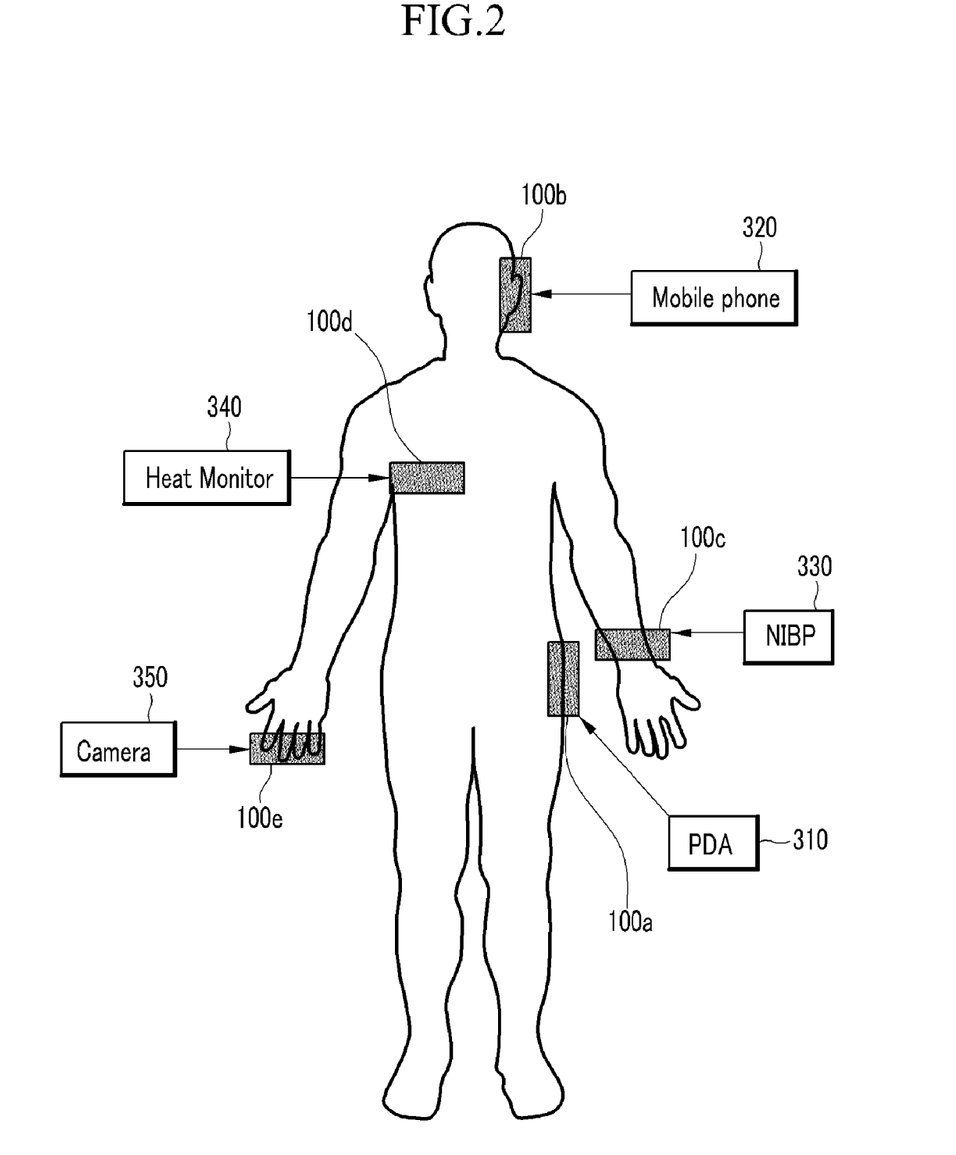
FIG. 2 exemplarily shows a communication system using the communication apparatus according to an exemplary embodiment of the present invention.

FIG. 1 shows a communication apparatus for accessing a human body and a host according to an exemplary embodiment of the present invention, and FIG. 2 exemplarily shows a human body communication network formed by using a plurality of communication apparatuses according to an exemplary embodiment of the present invention.

As shown in FIG. 1, a communication apparatus 100 is in direct contact with skin of a human body 300, is connected with a host 200, and transmits/receives a signal. As shown in FIG. 2, a human body communication network can be established in an area close to the human body 300 by a plurality of hosts 200 and a plurality of health monitoring apparatuses. The plurality of hosts 200 represent a plurality of communication apparatuses including a PDA 210, a mobile phone 220, and a digital camera 250, and the health monitoring apparatuses include a NIBP module 230 and a heart monitor 240. In addition, the communication apparatus according to the embodiment of the present invention may be applied to perform date communication through the human body by using the respective independent apparatuses shown in FIG. 2 as well as components of a wearable computer. At this time, the respective hosts 210 to 250 as shown in FIG. 1 access the human body by using the communication apparatus 100 as a communication medium. The host 200 that has received information transmitted from the communication apparatus 100 may transmit the information to a computer provided at an external area of the human body 300.

The communication apparatus 100 in a human body communication network configured as shown in FIG. 2 generates a base-band signal to transmit the same through the human body. Accordingly, a low pass channel, which has a bandwidth wide enough to accommodate frequencies of a series of data, is formed in the human body to perform half-duplex communication. Therefore, when the data are transmitted from both sides of the communication channel, which is configured by contacting the plurality of communication apparatuses 100 with the human body, a data loss occurs due to collision. Accordingly, these communication apparatuses 100 must be controlled by the communication rule and order.

Figure 3:
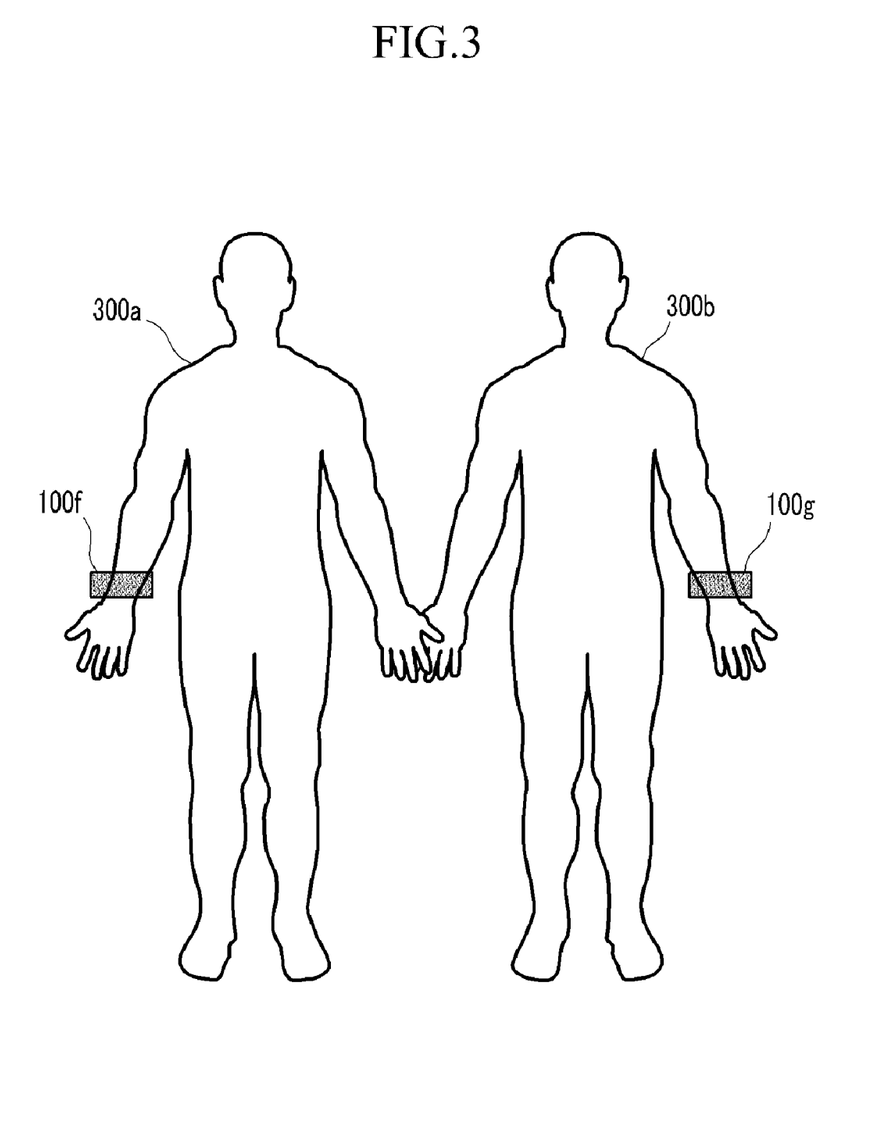
FIG. 3 exemplarily shows another communication system using the communication apparatus according to the exemplary embodiment of the present invention.

FIG. 3 exemplarily shows another communication system using the communication apparatus according to the exemplary embodiment of the present invention. As shown in FIG. 3, when two persons 300a and 300b directly contacted with the communication apparatus 100 accessing the host 200 are in physical contact with each other, the two persons 300a and 300b form a human body communication network so that data can be communicated therethrough. That is, when a plurality of persons respectively in contact with the communication apparatus 100 are in physical contact with each other, a data transmission channel may be established between the plurality of persons. Therefore, a communication system that uses human bodies as a data transmission channel can be generated by applying the communication apparatus 100 according to the exemplary embodiment of the present invention in a manner shown in FIG. 3.

Figure 4:
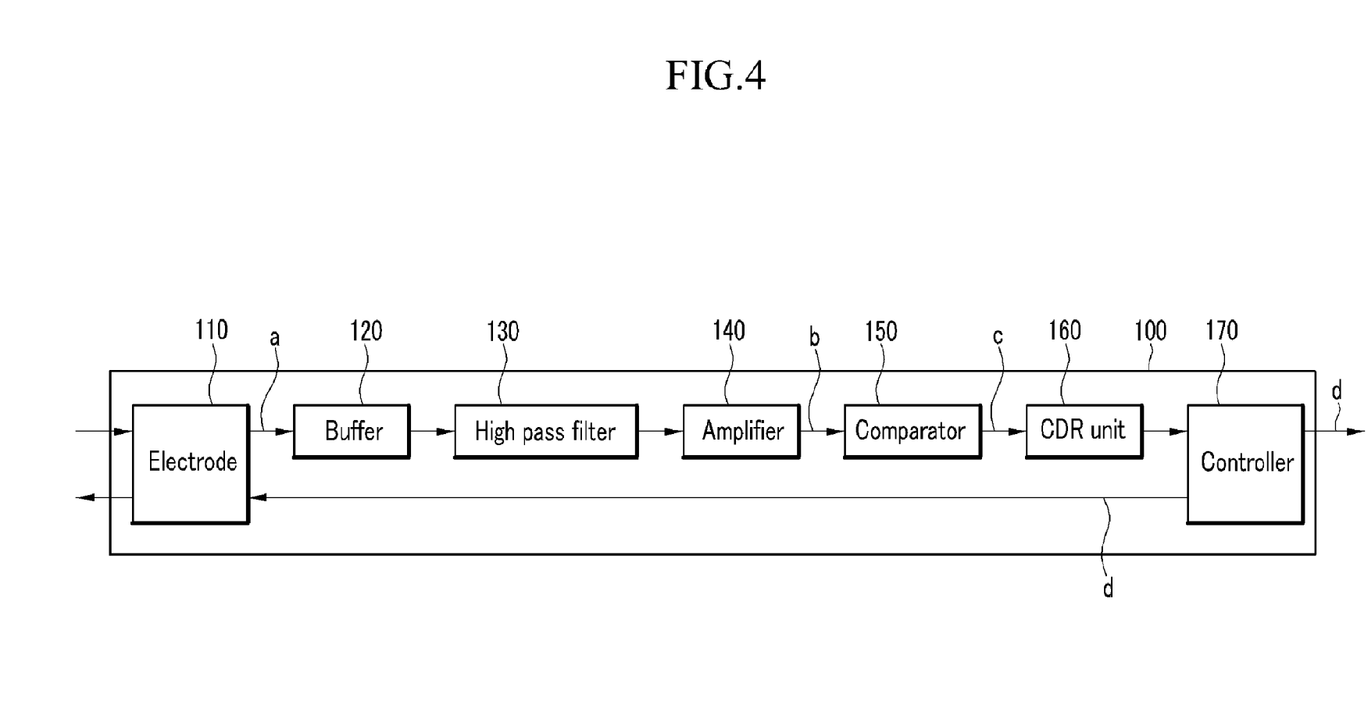
FIG. 4 is a block diagram illustrating a communication apparatus according to a first exemplary embodiment of the present invention.
Figure 5:
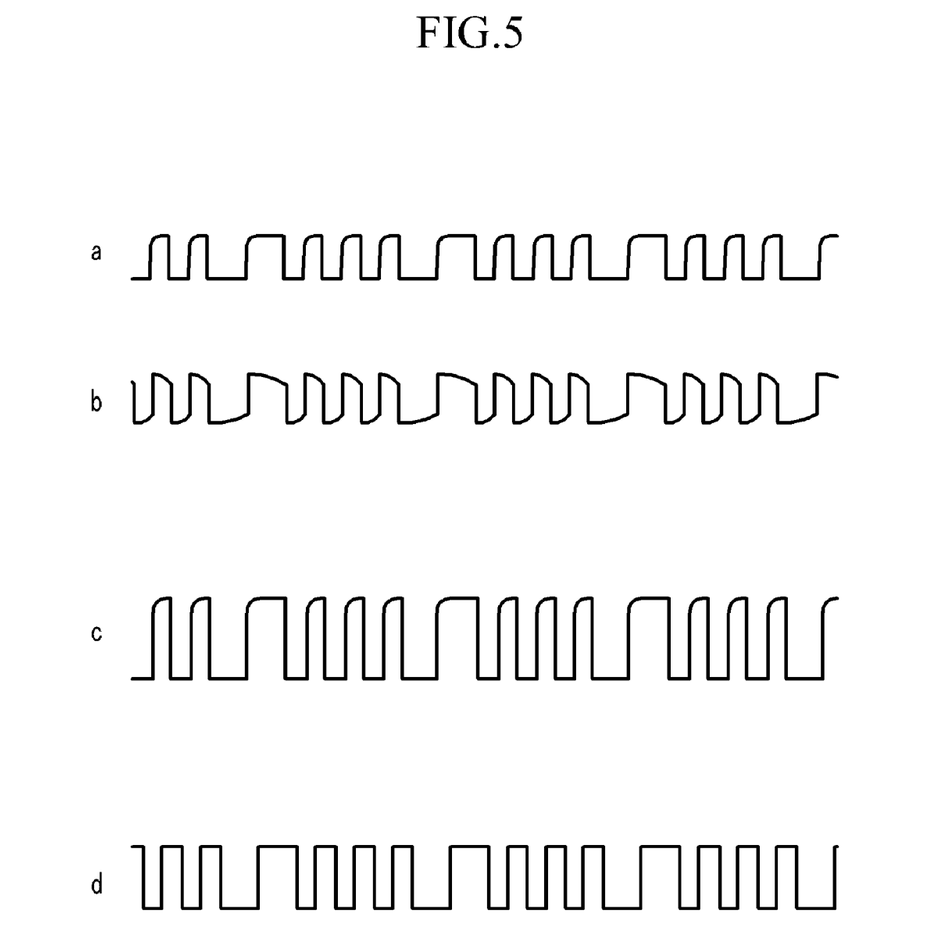
FIG. 5 shows a signal waveform of each part in the communication apparatus of FIG. 4.

FIG. 4 is a block diagram showing a communication apparatus according to a first exemplary embodiment of the present invention, and FIG. 5 shows signal waveforms of respective parts in the communication apparatus of FIG. 4.

As shown in FIG. 4, the communication apparatus 100 includes an electrode unit 110, a buffer 120, a high pass filter (HPF) 130, an amplifier 140, a comparator 150, a clock and data recovery (CDR) unit 160, and a controller 170. The communication apparatus 100, as shown in FIG. 1, is in contact with the human body to transmit information via the human body to a host 200.

That is, the communication apparatus 100 is in direct contact with skin through the electrode unit 110 which flows a small amount of current into the skin to measure body fat so that information can be communicated through the human body. In addition, the communication apparatus 100 realizes the human body communication when it is coupled with the host 200 so that desired data is transmitted through the human body to another communication apparatus and the other communication apparatus receives, recovers, and transmits a signal to the coupled host.

As shown in FIG. 4, the communication apparatus 100 according to the exemplary embodiment of the present invention is configured to realize the data communication by using the base-band signal rather than by using a radio frequency (RF) module, and accordingly the communication apparatus 100 generates a signal and transmits/receives the signal via the current without performing a frequency modulation process on the signal.

The case of the communication apparatus 100 receiving a signal transmitted through the human body will now be described in more detail.

Being in direct contact with the human body and transmitting/receiving a signal, the electrode unit 110 flows the current that has been transmitted from the host 200 to the communication apparatus 100 and that includes the base-base signal generated from the controller 170, to the human body 300. In addition, the electrode unit 110 receives a data signal of the base-band signal transmitted through the human body where the electrode unit 110 is attached. A part "a" of FIG. 5 shows a waveform of a signal transmitted from a part "a" of FIG. 4, that is, a waveform of a signal received at the electrode unit 110 of the communication apparatus 100.

The buffer 120 reduces consumption of the current of the communication apparatus 100 by increasing input impedance thereof.

The HPF 130 eliminates noise included in the received signal through the electrode unit 110 during a transmission process through the human body. The noise is generated due to heterogeneity of components of the human body used as a data transmission channel in the present invention, and it is added to the signal during the transmission process and is eliminated by the HPF 130. When low frequency noise and high frequency noise exist in the signal, it is efficient to eliminate the noise component excluding a signal component that includes data by using a band pass filter (BPF). However, experimental results show that the communication apparatus 100 using the human body as a propagation medium has a superior signal recovery performance when using the HPF rather than using the BPF. This will be described in more detail with reference to FIG. 6.

According to the exemplary embodiment of the present invention, the noise in the received signal is eliminated by using the HPF 130, but a matched filter or an integrate-and-dump filter may replace the HPF 130 in the configuration of the communication apparatus 100.

The amplifier 140 amplifies the signal transmitted through the buffer 120 and the HPF 130 for easy signal recovery in the controller 170. A part "b" of FIG. 5 shows a waveform of a signal of the part "a" of FIG. 4 which is amplified by the amplifier 140 after the noise of the signal is eliminated through the buffer 120 and the HPF 130.

The comparator 150 compares the noise-eliminated signal with a reference voltage and outputs the signal in the form of a binary code signal. That is, the comparator 150 determines a logic "0" or a logic "1" by comparing the received signal with the reference voltage. The comparator 150 transmits a pulse waveform signal generated as a result of the comparison between the reference voltage and the received signal to the CDR unit 160. A part "c" of FIG. 5 shows a waveform of a signal of a part "c" of FIG. 4, that is, a signal generated through the comparator 150. As shown in FIG. 5, a pulse width and a level of the signal output from the comparator 150 become non-uniform. In addition, a voltage level of the signal recovered by the controller 170 and output therefrom is dependent on a power voltage level, and accordingly, when the level of the power voltage is not great enough so that data communication cannot be efficiently achieved, the level of the voltage of the signal should be increased. In this case, a high-level voltage can be generated by using a direct current/direct current (DC/DC) converter and applied to the comparator 150 to thereby increase the level of the voltage of the signal input to the controller 170.

The CDR unit 160 analyzes the received data frame and performs a clock and data recovery function. For clock recovery, start time and end time of each code should be known, and such time information can be included in a preamble of the transmitted data frame. Thus, the CDR unit 160 analyzes the preamble of the data frame when receiving the data from the comparator 150, checks the start time and the end time of each code, corrects a cycle of the received data signal, and detects errors. The CDR unit 160 may include a circuit commonly used for clock and data recovery.

The controller 170 checks and corrects an error in the data signal from the CDR unit 160, and recovers the signal received through the electrode unit 110. At this time, the controller 170 may use time information extracted from the CDR unit 160. The signal recovered through the above-stated process may be transmitted to the host 200 coupled with the communication apparatus 100, or may be stored in a memory (not shown) in the communication apparatus 100. A part "d" of FIG. 5 shows a waveform of the signal recovered by the controller 170.

According to the above-stated exemplary embodiment of the present invention, the CDR unit 160 and the controller 170 are separately provided and separately used to thereby reduce a data process load and efficiently use resources, but it is possible to configure the controller 170 to perform functions of the CDR unit 160.

The case of the communication apparatus 100 transmitting a signal will now be described.

When the communication apparatus 100 that has received a data signal from a host wants to transmit the data signal through the human body 300, the controller 170 receives the data signal from the host 200 coupled with the communication apparatus 100 and performs quantization and encoding on the signal to generate a base-band signal. At this time, the controller 170 selects an encoding method that is appropriate for a communication status and generates a signal. The generated data stream may have various types of signals such as a non-return-to-zero (NRZ) signal, a return-to-zero (RZ) signal, a Manchester signal, etc. After pulse-code modulating the data, the controller 170 applies a voltage with a level that is appropriate for the communication apparatus 100, generates the base-band signal, and transmits the base-band signal to the electrode unit 110. The electrode unit 110 receives the base-band signal and outputs the signal through the human body 100 so that data can be communicated through the human body. The signal generated through the above-stated process has a waveform shown in the part "d" of FIG. 5.

In addition, the controller 170 may have an impedance control function for controlling input and output impedance. Through the impedance control function, stable data communication can be achieved by controlling the impedance even though the impedance of the human body 300 used as a transmission channel may have been changed when a part of the human body 300 where the communication apparatus 100 is attached has been changed or health status has been changed. In addition, the controller 170 defines a communication order and rule between the communication apparatuses 100 during the data communication process to prevent a data collision phenomenon and to increase data transmission efficiency, thereby preventing waste of communication resources.

The communication apparatus 100 does not frequency-modulate using a RF module since it is configured to convert an analog signal to a base-band signal and transmit the base-band signal, and accordingly the communication apparatus 100 has low power loss according to the exemplary embodiment of the present invention.

Figure 6:
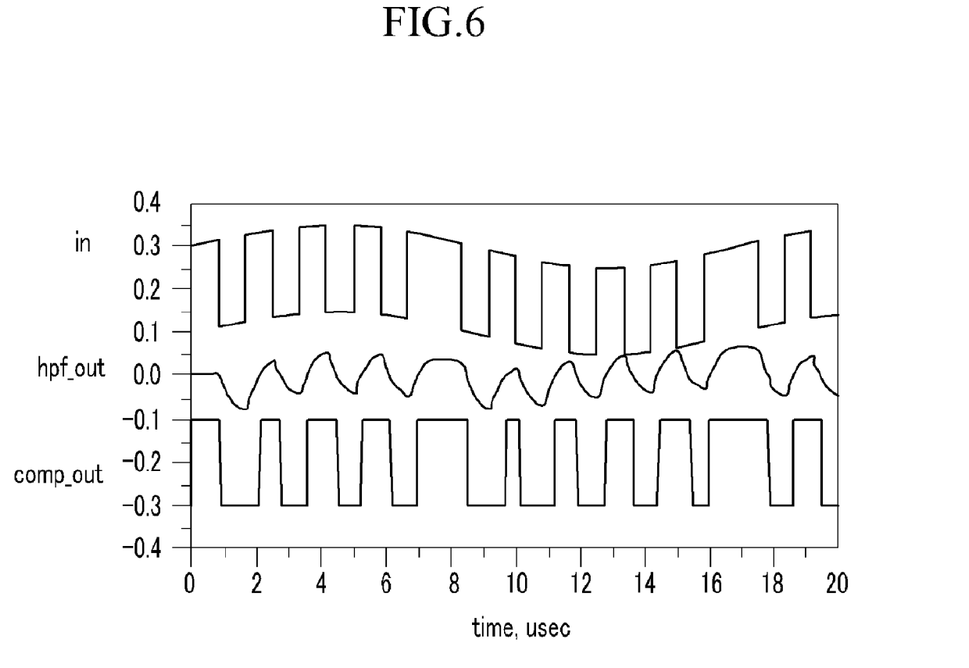
FIG. 6 shows signal recovery performance of a human body communication apparatus using a band pass filter.
Figure 7:
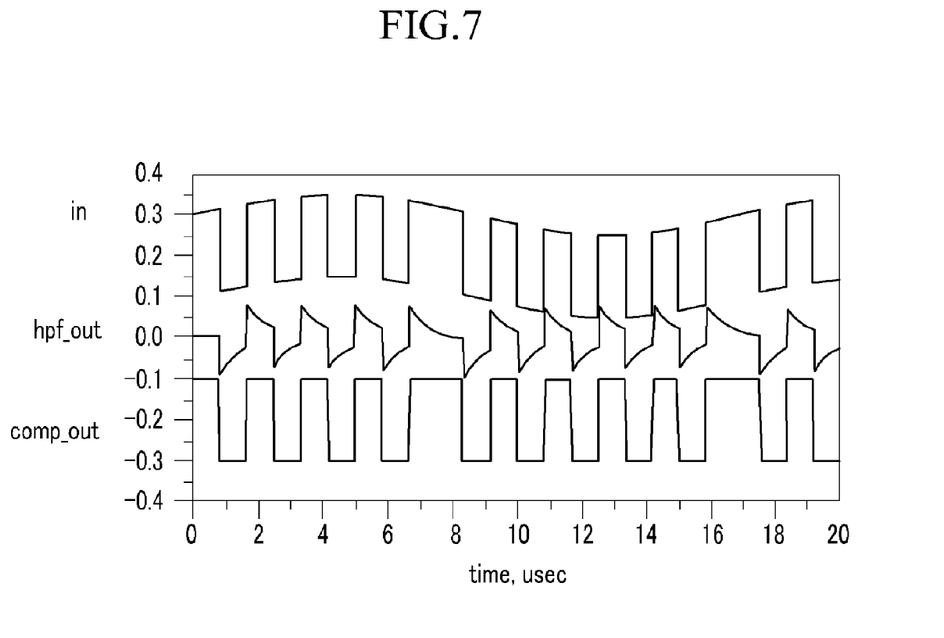
FIG. 7 shows signal recovery performance of the communication apparatus according to the exemplary embodiment of the present invention.

FIG. 6 show a signal recovery performance of the human body communication apparatus using a BPF, and FIG. 7 shows a signal recovery performance of the communication apparatus according to the exemplary embodiment of the present invention. As shown in FIG. 6 and FIG. 7, the communication apparatus performs excellent signal recovery when using the HPF rather than the BPF.

A part "in" of FIG. 6 and FIG. 7 shows a waveform of a signal received through the electrode unit 110, a part "comp_out" of FIG. 6 shows an output waveform of the BPF, and a part "hpf_out" of FIG. 7 shows an output waveform of the HPF 130.

As shown in FIG. 6 and FIG. 7, a signal transmitted from the communication apparatus 100 according to the exemplary embodiment of the present invention is received at another communication apparatus 100 through the human body in the form of a pulse.

When the pulse signal is processed using the BPF, a sine wave pulse is output. When the sine wave pulse is processed through the comparator 150, a pulse with a non-uniform width is output. That is, a 1 bit input signal is processed to be output signals with different pulse widths, and the output signals may be delayed compared to the input signal.

Meanwhile, when an input signal is processed by using the communication apparatus 100 according to the exemplary embodiment of the present invention, an output pulse waveform of the HPF looks similar to the input signal as shown in FIG. 7. When the output pulse waveform which is similar to the input signal is processed by using the comparator 150, the comparator 150 outputs a waveform having a pulse width that corresponds to the pulse width of the input signal as shown in FIG. 7. When the communication apparatus 100 according to the exemplary embodiment of the present invention is used, the recovered signal becomes very similar to the corresponding input signal, and accordingly the possibility of error occurrence is decreased. This implies that the signal recovery performance of the communication apparatus 100 according to the exemplary embodiment of the present invention is superior to that of the BPF in eliminating noise generated during transmission through the human body.

Figure 8:
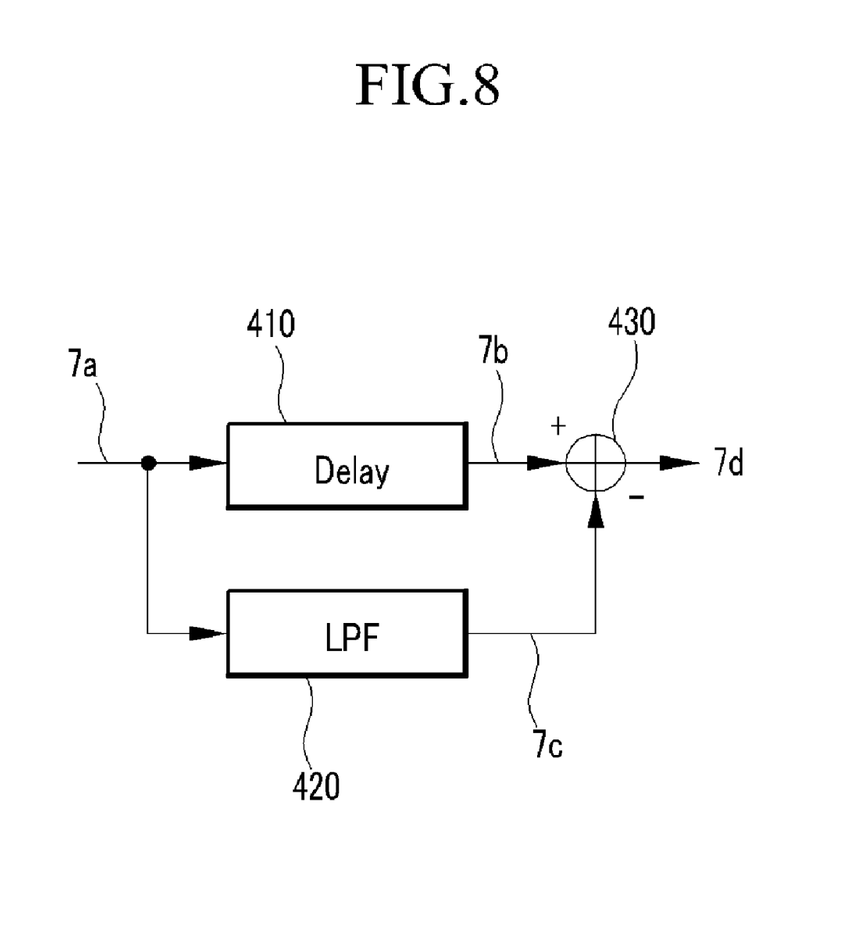
FIG. 8 is a block diagram showing a filter replacing a high pass filter of FIG. 4.
Figure 9:
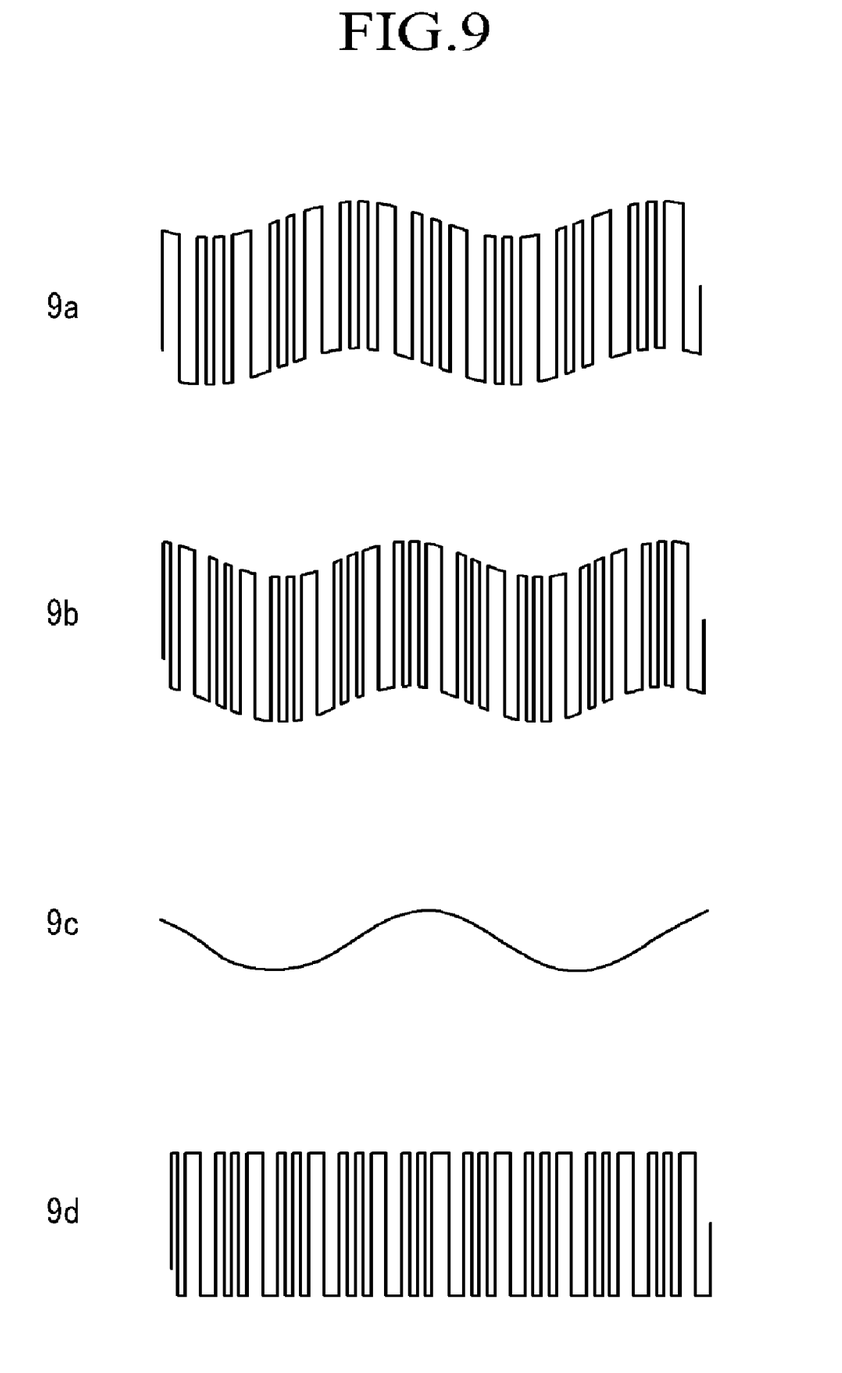
FIG. 9 is a signal waveform of each part of FIG. 8.

FIG. 8 is a block diagram of a structure replacing the HPF of FIG. 4, and FIG. 9 shows signal waveforms of respective parts of FIG. 8.

In the communication apparatus 100 according to the exemplary embodiment of the present invention, the HPF 130 may be replaced with a structure configured to eliminate noise based on a feed-forward method. As shown in FIG. 8, the structure designed for eliminating noise includes a delay unit 410, a low pass filter (LPF) 420, and a subtractor 430.

Signals received through the electrode unit 110 and processed through the buffer 120 has a waveform shown in a part "7a" of FIG. 9. The LPF 420 is provided for extracting only low frequency noise included in the signal and outputs a waveform shown in a part "7c" of FIG. 9. To synchronize a delay time due to a signal process of the LPF 420, the input signal is delayed by using the delay unit 410 such that a signal shown in a part "7b" of FIG. 9 is generated. The two signals are processed by the subtractor 430 and the signal of the part "7c" is subtracted from the part "7b" such that a low-frequency-eliminated signal is generated as shown in a part "7d" of FIG. 9. That is, it has the same effect as using the HPF 130.

Figure 10:
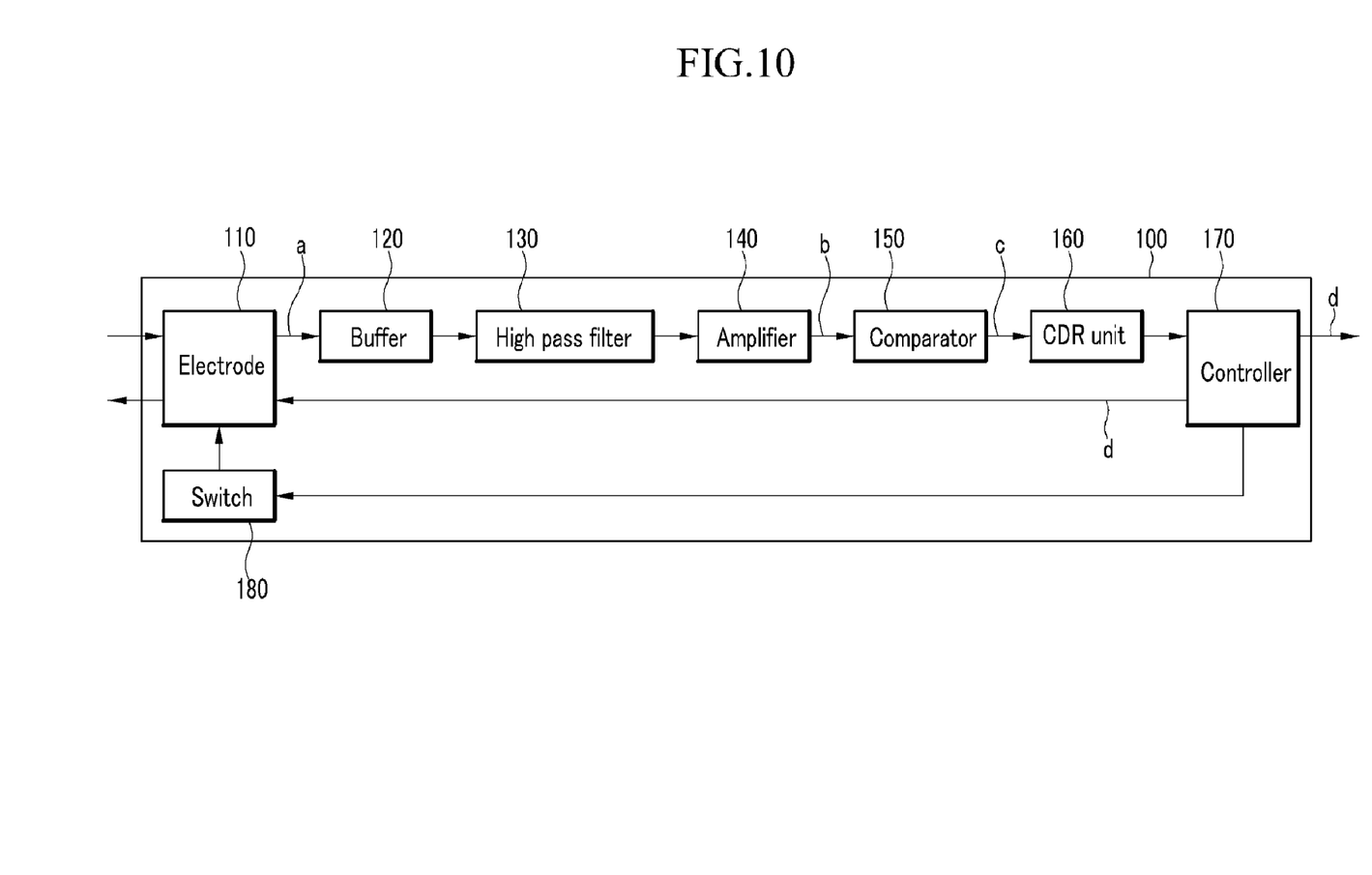
FIG. 10 is a block diagram showing a communication apparatus according to a second exemplary embodiment of the present invention.

FIG. 10 is a block diagram showing a communication apparatus according to a second exemplary embodiment of the present invention. As shown in FIG. 10, the communication apparatus according to the second exemplary embodiment of the present invention includes the same elements as the communication apparatus 100 according to the first embodiment of the present invention, and further includes a switch 180. However, an electrode unit 110 according to the second exemplary embodiment of the present invention includes a plurality of electrodes.

The electrode unit 110 includes a plurality of electrodes that vary in size and shape. The respective electrodes may be divided into a signal electrode for transmitting a data signal and a ground electrode and used accordingly, and intervals between the respective electrodes of the electrode unit 110 may be variously changed and used.

The switch 180 switches the plurality of electrodes included in the electrode unit 110 in accordance with a control signal of the controller 170 so that the respective electrodes function as the ground electrode or the signal electrode.

Figure 11:
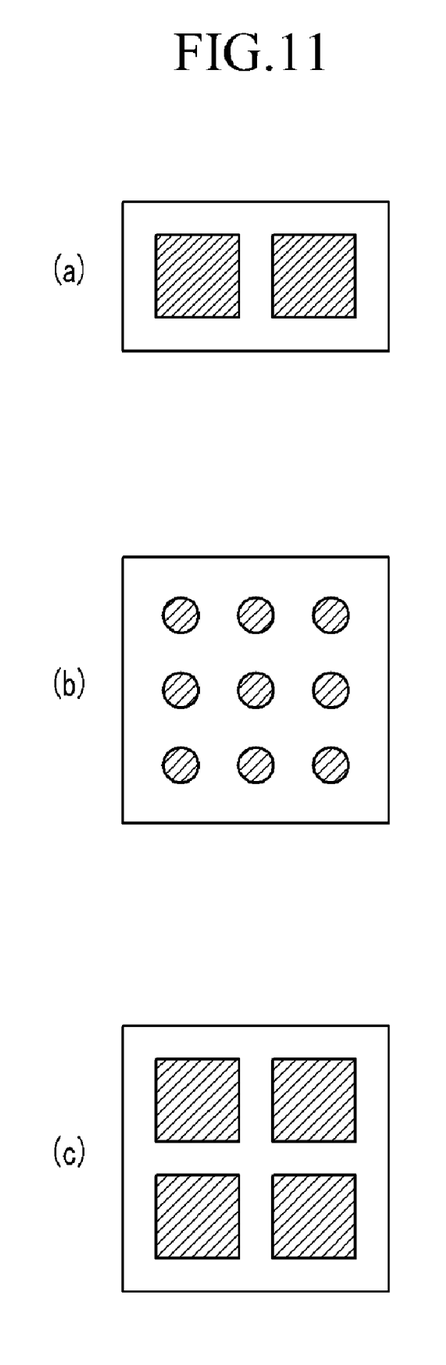
FIG. 11 exemplarily shows an electrode arrangement in the communication apparatus according to the second exemplary embodiment of the present invention.

FIG. 11 exemplarily shows an electrode arrangement of a communication apparatus according to another exemplary embodiment of the present invention. The electrode unit 110 according to the second exemplary embodiment of the present invention may have various arrangements as shown in FIG. 11. As shown in a part (a) of FIG. 11, an electrode unit may include two electrodes, and one electrode is used as a signal electrode for transmitting a signal and the other is used as a ground electrode for grounding. In addition, as shown in parts (b) and (c) of FIG. 11, three electrodes may be provided and thus one of them is used as the ground electrode and the rest are used as the signal electrodes. At this time, the controller 170 and the switch 180 may select the ground electrode, considering a location to which the communication apparatus 100 is attached and the amount of data to be transmitted. In addition, all the electrodes included in the electrode unit 110 may be used as the signal electrodes instead of dividing the electrodes into the ground electrode and the signal electrode. In order words, the communication apparatus 100 can be floated.

When the communication apparatus 100 is used as a transmitter and a data signal is transmitted by setting one of the plurality of electrodes of the electrode unit 110 to be the ground electrode, an output voltage of the transmitted signal can be consistently maintained such that a higher level of power may be transmitted, thereby enhancing data transmission efficiency. On the other hand, when the communication apparatus 100 is used as a receiver, the ground electrode may interrupt receiving of the signal since the power of the received signal increases in proportion to the size of the area of the human body where the electrodes are attached. Therefore, when the communication apparatus 100 is used as the receiver, the respective electrodes of the electrode unit 110 are set to be the signal electrode for receiving a signal so as to improve receiving performance.

Figure 12:
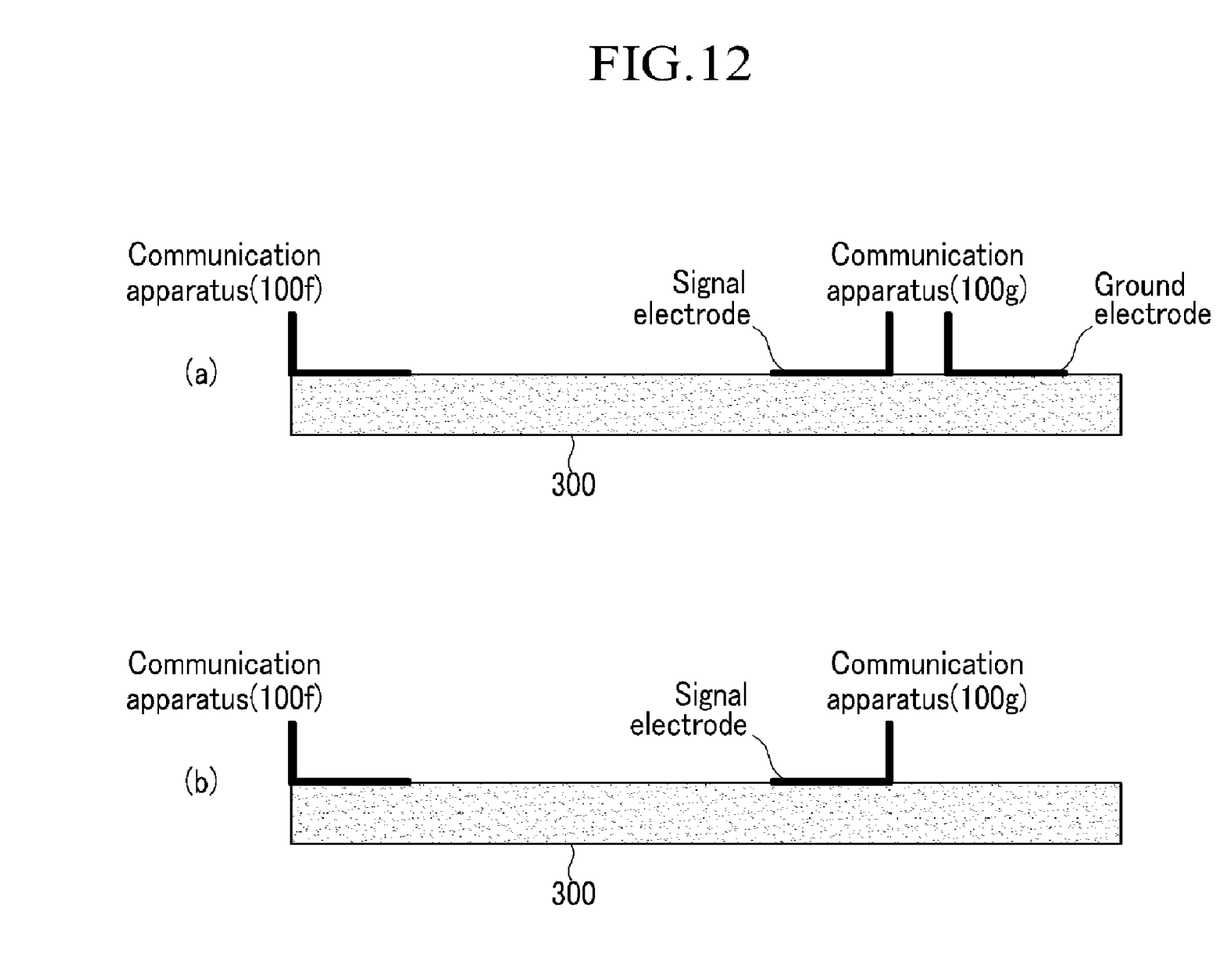
FIG. 12 shows a state when a ground electrode and a signal electrode are set and when only a signal electrode is set in the communication apparatus according to the second exemplary embodiment of the present invention.

FIG. 12 shows the communication apparatus according to the second exemplary embodiment of the present invention in the case of using ground and signal electrodes and in the case of using a signal electrode. FIG. 12 shows a communication apparatus 100$f$ used as a transmitter and another communication apparatus 100$g$ used as a receiver. Herein, in (a), one of a plurality of electrodes included in the electrode unit 110 of the communication apparatus used as the receiver is set to be a ground electrode and the rest are set to be signal electrodes. In (b), all of the electrodes included in the electrode unit 110 are set to be the signal electrodes. A result of setting the electrodes as shown in (a) and (b) of FIG. 12 is that the communication apparatus 100$g$ used as the receiver outputs a voltage of 59 mV and the communication apparatus 100$f$ used as the transmitter outputs a voltage of 5 mV. This result implies that the receiving performance can be improved when using all the electrodes as the signal electrodes rather than dividing the electrodes into the ground electrode and the signal electrode. The communication apparatus 100 according to the second exemplary embodiment of the present invention includes a plurality of electrodes and utilizes the plurality of electrodes in various ways to thereby control transmitting/receiving efficiency and easily attach the communication apparatus 100 to a curved area of the human body.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A human body communication apparatus comprising:
an electrode unit, in direct contact with a human body, configured to transmit a base-band signal in the form of a current through the human body and receive a signal from the human body, wherein the base-band signal is a non-frequency-modulated signal;

a high pass filter configured to eliminate noise included in the base-band signal received through the electrode unit;

a comparator configured to compare the base-band signal transmitted through the high pass filter with a reference voltage;

a controller configured to recover the base-band signal transmitted through the comparator, transmit the recovered signal to an external host located in a vicinity of the human body, and further configured to receive a data signal in the form of a current from the external host, generate a second base-band signal, and transmit the second base-band signal to the human body through the electrode unit; and an amplifier configured to amplify the signal transmitted from the high pass filter and transmit the amplified signal to the comparator.

2. A human body communication apparatus for intermediating between a host, and transmitting and receiving data through the human body, the human body communication apparatus comprising:

an electrode unit, in direct contact with the human body, configured to transmit a signal in the form of a current through the human body and receive a signal from the human body;

a high pass filter configured to eliminate noise included in the signal received from the electrode unit;

a comparator configured to compare the signal transmitted through the high pass filter with a reference voltage;

a controller configured to recover the signal transmitted through the comparator, transmit the recovered signal to the host, generate a base-band signal, and transmit the base-band signal to the human body through the electrode unit;

an amplifier configured to amplify the signal transmitted from the high pass filter and transmit the amplified signal to the comparator; and a clock and data recovery (CDR) unit configured to analyze the signal transmitted from the comparator and perceiving perceive start and end times of recovering of the received signal.

3. The human body communication apparatus of claim 2, wherein the controller generates a signal by employing pulse coding modulation.

4. The human body communication apparatus of claim 3, wherein the controller is configured to recover the received signal and transmit the recovered signal to the host coupled to the communication apparatus.

5. The human body communication apparatus of claim 4, further comprising a direct-current/direct-current (DC/DC) converter for increasing an output voltage of the comparator.

6. The human body communication apparatus of claim 2, wherein the high pass filter comprises:

a delay unit configured to delay and output the signal received through from the electrode unit;

a low pass filter configured to process the received signal; and a subtractor configured to subtract an output signal of the low pass filter from an output signal of the delay unit.

7. The human body communication apparatus of claim 2, further comprising a plurality of electrodes each having different sizes, respectively.

8. The human body communication apparatus of claim 7, further comprising a switch configured to control transmitting and blocking of signals to the plurality of electrodes.

9. The human body communication apparatus of claim 8, wherein the switch sets one of the plurality of electrodes to be a ground electrode when the communication apparatus is used for data transmission.

* * * * *